United States Patent
Galan et al.

(12)

(10) Patent No.: US 6,361,134 B1
(45) Date of Patent: Mar. 26, 2002

(54) FLAT BED RASTER DRAWING MACHINE

(75) Inventors: Mario Andrada Galan; Jose Ramon Perez Gonzalez; Fernando Diaz Zorita, all of Madrid (ES)

(73) Assignee: Investronica Sistemas, S.A., Madrid (ES)

( * ) Notice: Subject to any disclaimer, the term of this patent is extended or adjusted under 35 U.S.C. 154(b) by 0 days.

(21) Appl. No.: 09/086,232

(22) Filed: May 28, 1998

(30) Foreign Application Priority Data

May 30, 1997 (ES) .............................................. 9701193

(51) Int. Cl.[7] .................................................. B41J 3/00
(52) U.S. Cl. .......................................................... 347/2
(58) Field of Search ................................ 347/2, 29, 35, 347/19, 49, 7, 23, 30, 14, 8, 106, 93, 96, 109, 5, 104; 346/139 R; 358/296

(56) References Cited

U.S. PATENT DOCUMENTS

| 4,422,080 A | 12/1983 | Ticomb |
| 4,571,601 A | 2/1986 | Teshima |
| 4,739,415 A | * 4/1988 | Toyono et al. ............... 358/296 |
| 4,764,880 A | * 8/1988 | Pearl .......................... 347/29 |
| 4,916,819 A | 4/1990 | Gerber |
| 5,617,124 A | * 4/1997 | Taylor et al. ................. 347/35 |

FOREIGN PATENT DOCUMENTS

| DE | 3800633 A1 | 7/1989 | ............ B44D/2/00 |
| GB | 2274719 A | 8/1994 | ........... F16H/19/06 |

* cited by examiner

*Primary Examiner*—John Barlow
*Assistant Examiner*—Charles W. Stewart, Jr.
(74) *Attorney, Agent, or Firm*—Chapman and Cutler

(57) ABSTRACT

The flat bed raster drawing machine is controlled automatically, includes a flat table to bear a flexible material, such as paper, fixed guides on which a carriage moves perpendicular to the lengthwise axis of the flexible material between the aforementioned guides, and a second carriage bearing the pin printer array type head that moves over the preceding one, in the direction of the lengthwise axis of the paper. The paper is moved in a controlled manner on the table parallel to its lengthwise axis.

19 Claims, 13 Drawing Sheets

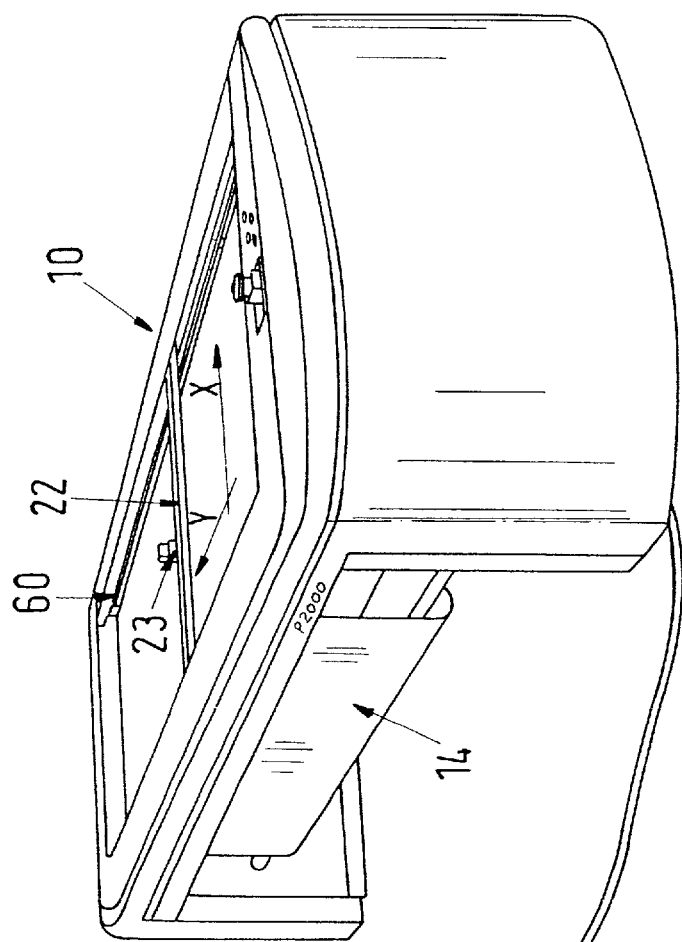
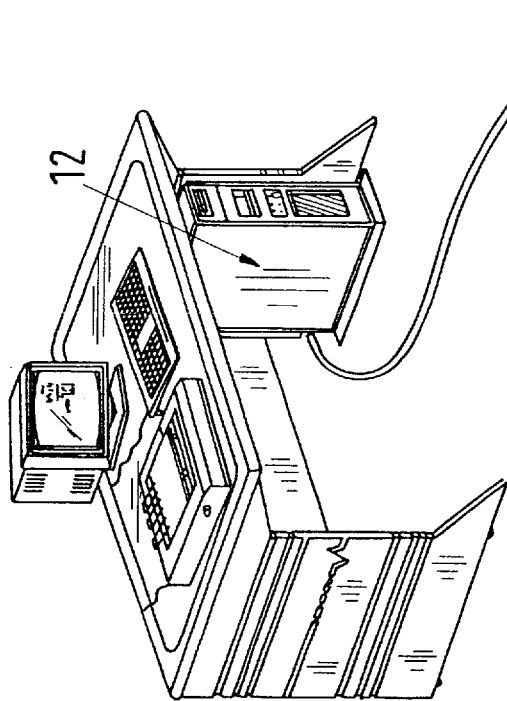
Fig.1

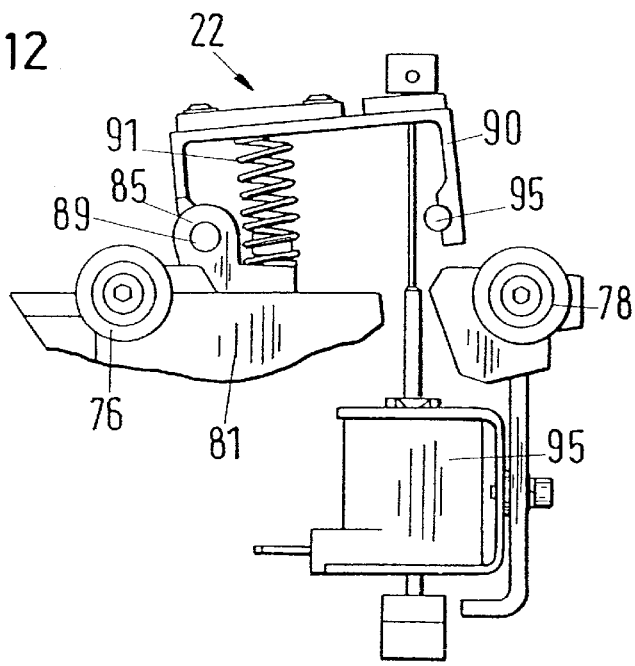
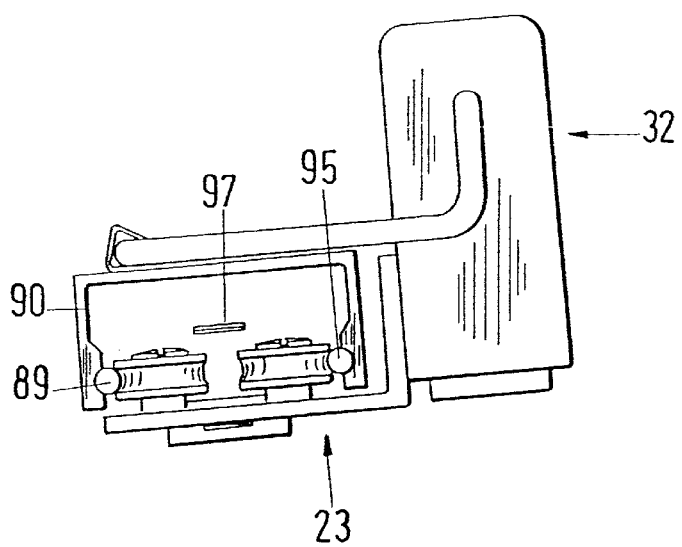
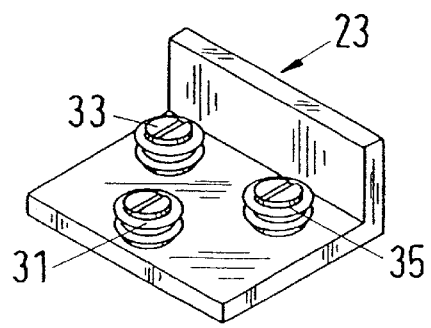

FLAT BED RASTER DRAWING MACHINE

FIELD OF THE INVENTION

The present invention relates to a drawing machine, also known as plotters, and more particularly to a raster type plotter, in which the drawing is produced by the combined movements of the printer head transversal to the paper advancement and the ink distribution from the different pens on the printing heads (or pins on an inked tape) at the appropriate positions.

The machine forming of this invention is especially useful for the tailoring industry, or another with similar characteristics as to the type of pieces used, precision required, density of lines per unit of surface drawn, etc., that also makes it necessary to reduce the cost of the drawing media, as great amounts of this are consumed.

BACKGROUND OF THE INVENTION

The drawing plotter is well known in the prior art as a machine that performs a graphic representation of design in different industrial fields, such as engineering, cartography, garments, furniture, etc.

There are two types of drawing plotters according to the type of paper used for the drawings: those that use paper cut to the size of the drawing to be made, or those using roll paper. The former tend to be limited by usually handling standard paper sizes up to one meter long, or require tables as large as the area of the drawing to be made, with the consequent high price of the machine obtained. The latter perform the drawing by combined movement of the paper and the drawing tool although they require very precise control of the bi-directional movement of the paper.

The types of machine aforementioned are known as flat bed plotters and drum plotters, the technology of which is well known, as may be seen in patents U.S. Pat. No. 3,857,525 (Gerber) by the firm Gerber Scientific, or the Spanish Patent No. 509082 by Investrónica, or the U.S. Pat. No. 4.593.469 by Autographic Business Form Inc.

To solve the inherent problems of these and others, other types of plotters were developed, to perform the drawing on tables that are smaller sized than the drawing to be performed; the full operation was performed on successive zones, then moving the paper across the drawing area, once the whole operation was performed in the work zone, moving the paper already drawn to a storage area and providing a new area of paper in the work zone. This required precise joints, although few of them. Examples of this technique may be seen in the patents U.S. Pat. Nos. 4,091,980 and 4,916,819.

In any case, the performance of such machines in meters of paper drawn per unit of time is very much dependent on the density of the drawing; moreover, due to the precision required, the mass in movement must be as little as possible.

The disadvantages of this type of machine avoided by raster type plotters, where the drawing is performed by the combined action of the movements of the printer head and advancement of the paper in a stepped manner. This is the case of the patent U.S. Pat. No. 4,686,540.

The performance by such machines is closely related to the width of the zone swept. On the other hand, the drawing is usually made on the perimeter of a cylindrical surface, on which the distance from the printer head to the paper is not constant, this leading to low yield and drawing qualities, limited sweep widths and the problems of excessive paper advancement.

To solve this problem, the previous patent uses several heads spaced out one from the other in the direction of the movement of the set of these, so when their displacement length is reduced, productiveness increases. This solution has the disadvantage of the head bearing table and a decrease in quality due to the excessive number of joints.

SUMMARY OF THE INVENTION

Therefore, there is a need to develop a drawing plotter which provides drawings of high quality and yield, and which is also compact.

The object of the present invention is to provide a flat raster plotter controlled automatically by a controller located under the control panel.

In accordance with the preferred embodiment of this invention, the machine consists of drawing instruments carried by a carriage that travels on rails in direction X on the drawing plane, and that carriage is mounted on another carriage that travels in direction Y perpendicular to the movement of the previous carriage, so the printing head bearing carriage may move to any point on the plan.

The relevant movements in both directions X and Y are produced by the movement generated by the motors, one controlling each displacement. The movement of these motors is transmitted directly from their axles to the respective drive pulleys by belts connected to the respective carriages.

The printing heads, of the linear group type, are mounted on the above heads so the total sweep width is the number of times the linear group as the number of heads used, producing the drawing by passing successively over the surface to draw, located on a flat table with a much greater width than the relevant size of the linear group of heads.

BRIEF DESCRIPTION OF THE DRAWINGS

FIG. 1 is a perspective view of the drawing machine of the present invention.

FIG. 12 is a partial view of the balance elements on the printing head.

FIG. 13 is a partial profile detailed view of the carriages on the X and Y axes.

FIG. 14 is a partial view of the carriage on axis X.

DETAILED DESCRIPTION OF THE PREFERRED EMBODIMENT

Figure 2:
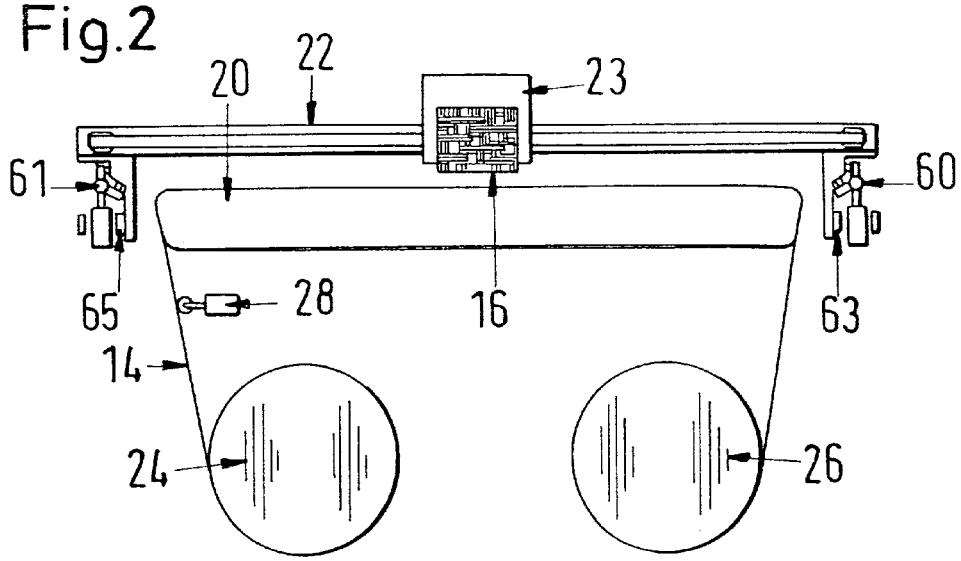
FIG. 2 is a schematic view of a section on a plane A in FIG. 1.
Figure 6:
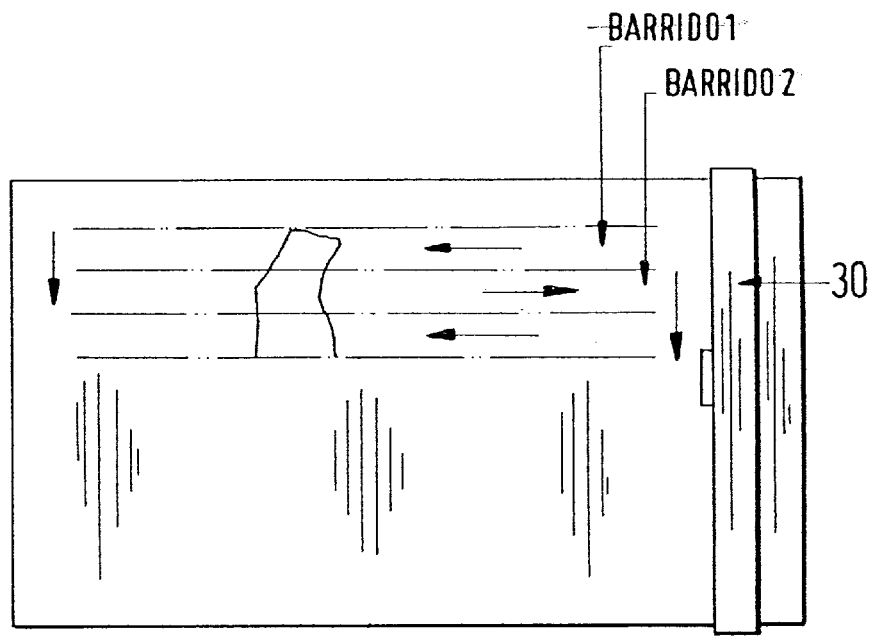
FIG. 6 is a plan scheme of the printing head movement.

The drawing plotter in this description is shown in FIG. 1. The plotter (10) forms part of a unit that includes a computer (12) for data processing and connection to a storage unit (not shown) that may be one of those known as CAD (Computer Aided Design) system, so the purpose of the plotter is to draw figures and information on flexible material (14) which we shall call paper hereinafter. The unit (10) includes a head (32) mounted on a carriage (23) of the linear marker type, which in the preferred implementation is of the drop on demand ink type, although another type of technology, impact for example, may be used; this head (16) performs the printing (18) on the zone of the paper (14) within the drawing area (20) (FIG. 2 and FIG. 6).

The configuration of the drawing plotter (10) is the conventional construction used for drawing plotters with vectorial technology. FIG. 2 is a scheme of the general configuration of the fundamental elements of the plotter; there is generally a carriage (22) that moves in a direction we shall call Y here, on top of which another unit (23) moves perpendicular to the first one in a direction which we shall call X. Both movements are performed by servo controlled motor sets, a scheme of which is provided as (5) and (11) in FIG. 5.

The paper (14) moves from a feed roller (24) to a motorized collection one (26). As in the movements of the elements 23 and 22, the movement of the paper is performed by a servo controlled motor set not shown in FIG. 2. The paper moved is captured by a measuring element (28) that moves when dragged by the paper. The paper moves forward once all the necessary figures are drawn in the drawing area (20), and the paper with the finished drawing is taken up by the collection roller (26), and the area (20) occupied by the new paper from the feed roller.

On present flat bed plotters, which are of the vectorial type, in the relevant place for the head (32) there is a point marker we shall call a ball point pen, used to draw the figures on the paper (14) located in the area (20). The trajectory of the ball point pen is that composing the movements of the activators X and Y on the carriages (22) and (23), so the point of the ball point pen draws the relevant trajectory for the figure to be traced on the X-Y plane.

On the plotter in this invention, the carriage (22) performs a continual back and forth movement above the whole width of the machine. During each one of these runs, the printer head (32) draws all the relevant information in the width swept on the paper, under control of the computer. At the end of each run, the carriage (32) performs a displacement equal to the width swept in the perpendicular direction, beginning the run in the opposite direction, drawing the figure for the new band. This process is repeated so the relevant drawing for the existing paper in the drawing area (20) is completed. Once this process is concluded on the whole area (20), the carriage (23) with the head (32) returns to the initial position (30), as shown in FIG. 6, at an end of the drawing area (20) while the paper (14) is dragged by the roller (26) to pull the paper forward.

The paper handling mechanism (FIGS. 2, 7 and 8) basically includes feed rollers (24), the motorized collection roller (26) and the paper measuring element (28). The motor-reducer (34) acts on the collection axle, and the brake (36) acts on the feed roller (24). This brake (36) keeps the paper in tension, preventing the feed roller (24) advancing more than necessary due to the effect of inertia, forming loops in the paper (14). Between the feed roller (24) and the board in the drawing area (20), the measuring element (28) is pressed against the running paper by the spring (40).

Figure 3:
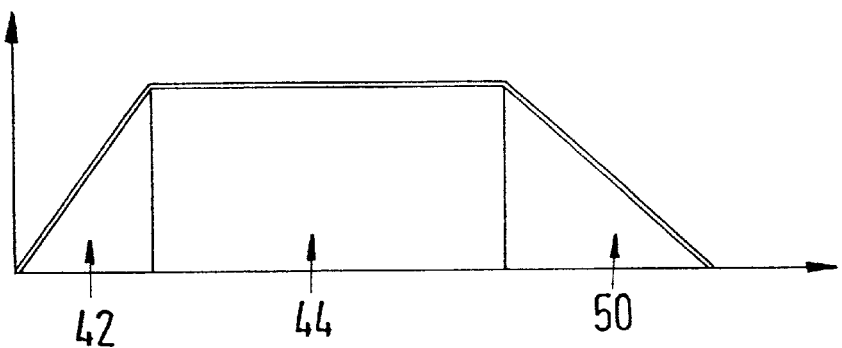
FIG. 3 is a space-time diagram of the forward movement of the paper.
Figure 4:
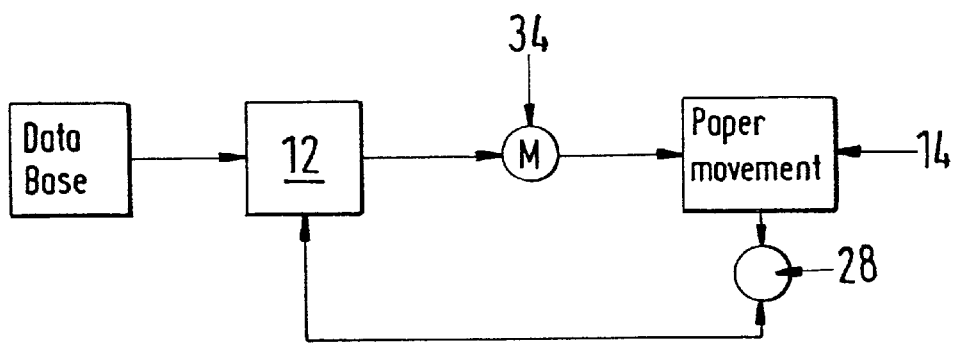
FIG. 4 is a block diagram of the paper control loop.
Figure 20:
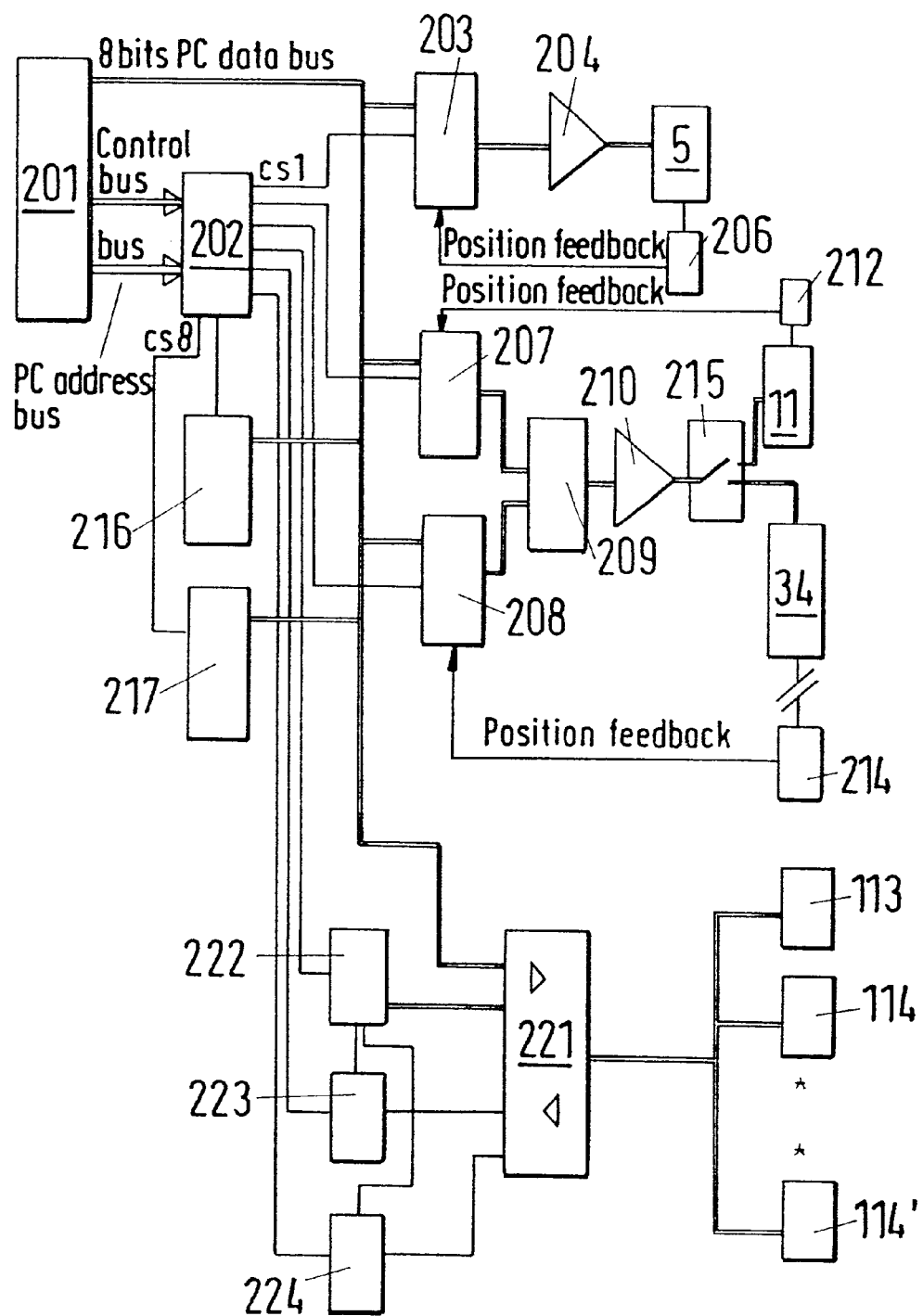
FIG. 20 is a block diagram of the control card.

The forward movement of the paper is controlled by the computer (12) in a closed loop (FIGS. 3, 4 and 20). The computer sends the movement to the motor (34) and receives the information from the measuring element (28). Normally, the process is performed according to the diagram represented in FIG. 3. In the previous group, one may see the zone where the movement begins and accelerates (42), a stretch of constant speed (44) and the stretch of deceleration and stopping (50), so the stop is precise, even with the great inertia the rolls of paper have.

Figure 7:
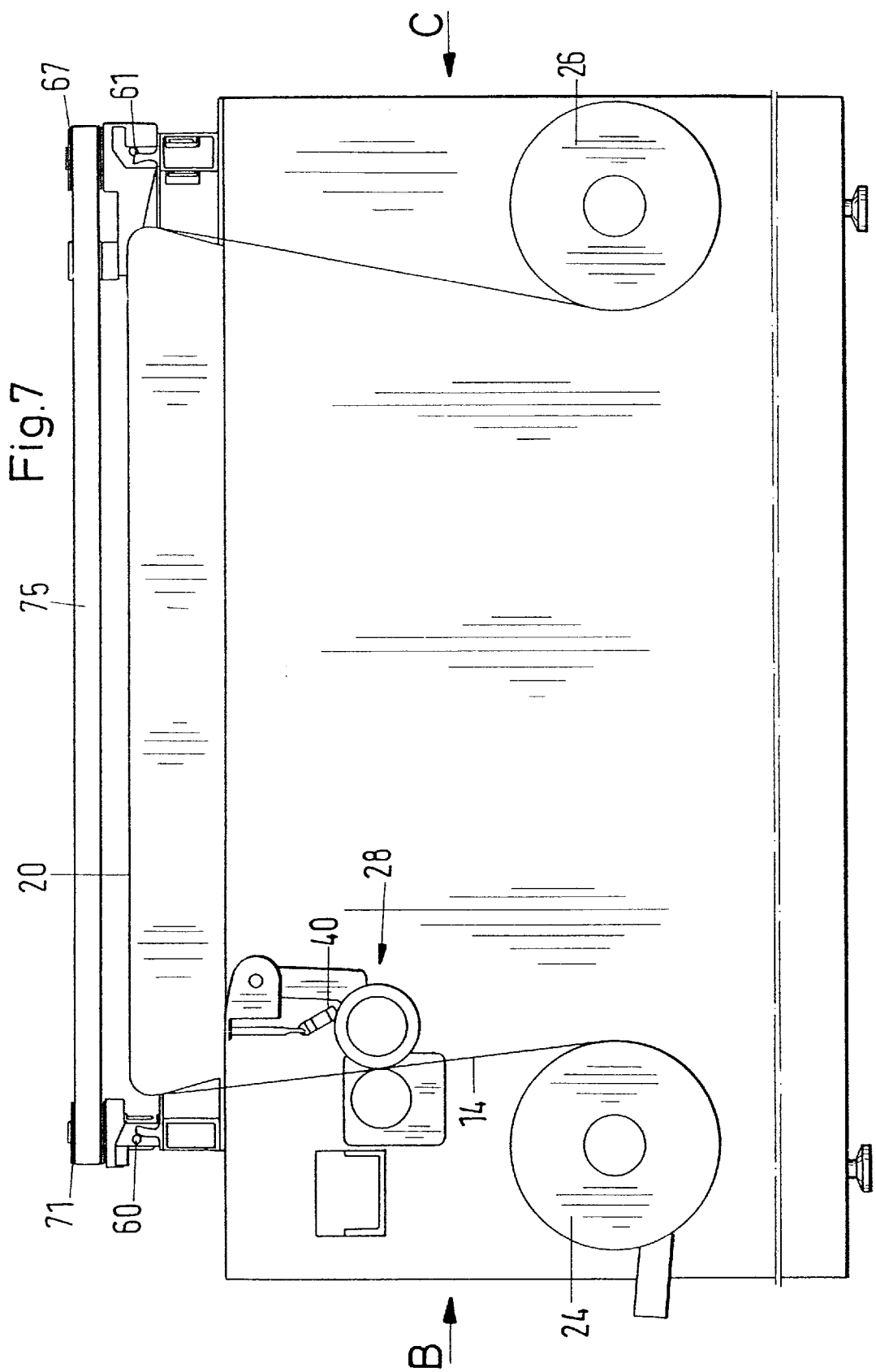
FIG. 7 is a partial vertical section view of the machine.
Figure 8:
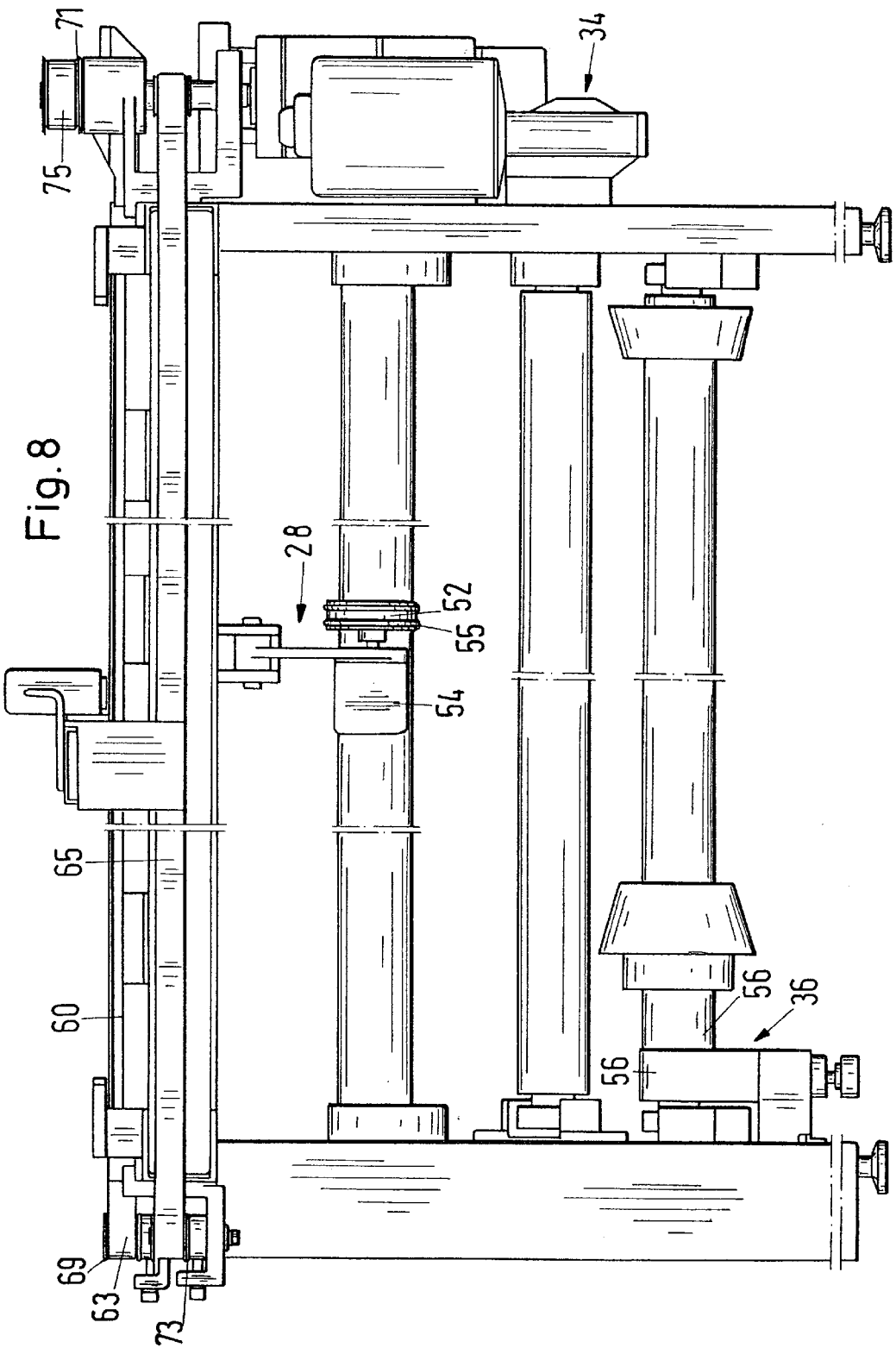
FIG. 8 is a plan front view of the machine in direction B of FIG. 7.

FIGS. 7 and 8 show the paper measurement set (28), generally comprised of a wheel (52), fitted on the axle of an encoder (54). The wheel (52) has rubber rings (56) to prevent slipping, and the encoder (54) transmits the relevant signal for paper advancement by optic reading on a disk marked with traces and the relevant transformation of the optic signals to electric, which may be read by the controller (12). (FIGS. 4 and 20)

Figure 9:
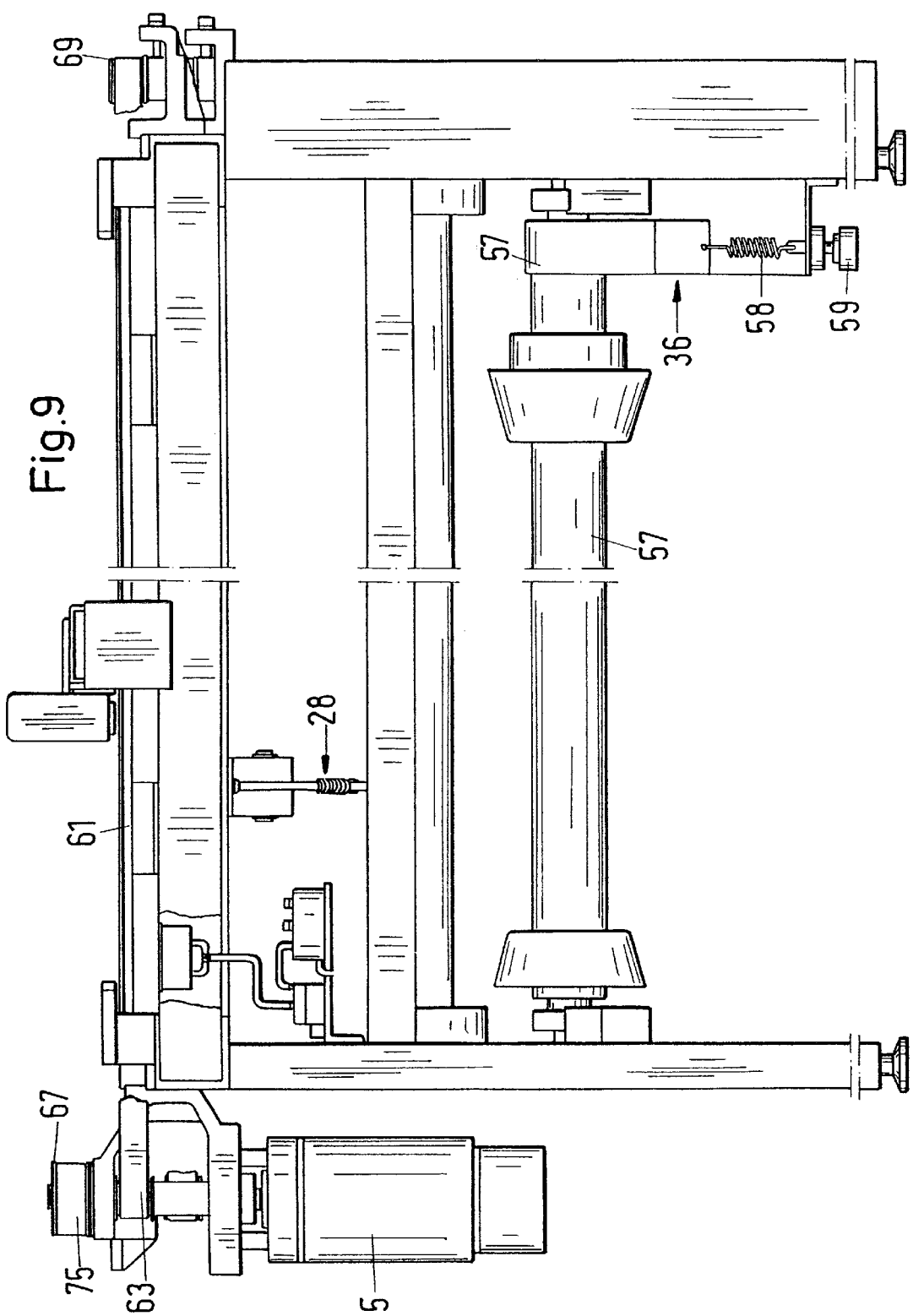
FIG. 9 is a plan rear view of the machine in direction C of FIG. 7.
Figure 10:
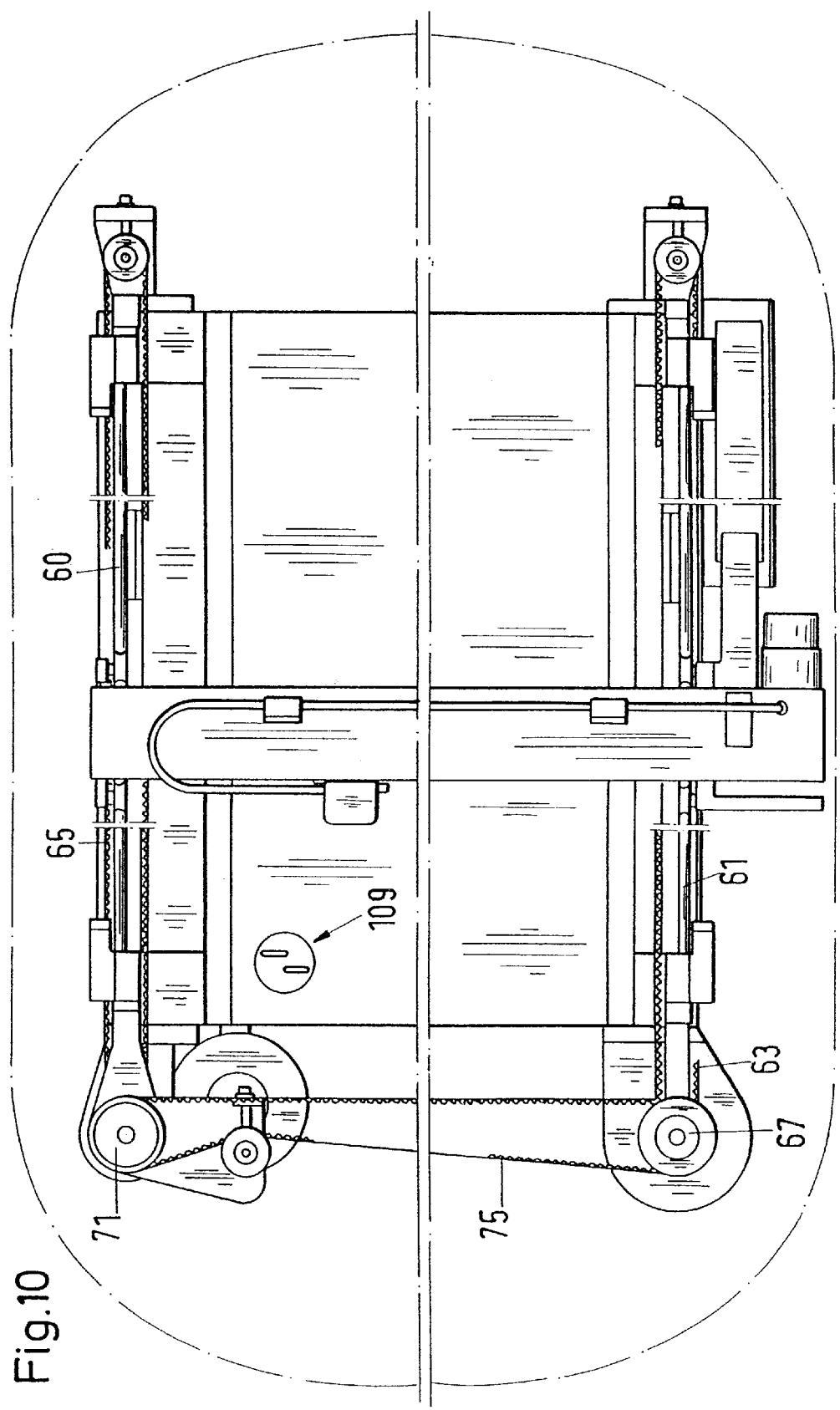
FIG. 10 is a top plan view of the drawing machine.

FIGS. 8 and 9 show the brake (36) on the feed roller (24), comprised of a band (55) with a high friction coefficient that acts on the axle (57) of the feed roller (24). The pressure is regulated by the action of the spring (58) and the regulation nut and bolt (59).

Figure 5:
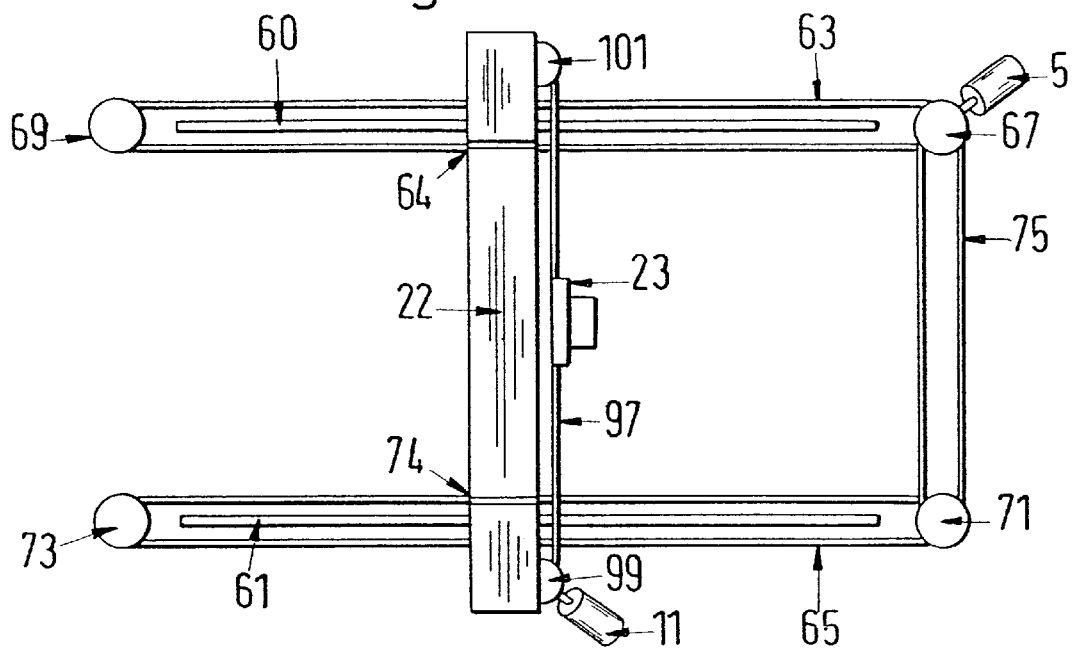
FIG. 5 is a scheme of the X and Y axis transmissions.

The transmission mechanism for the movement of carriages (22) and (23) may be seen in the scheme in FIG. 5. There are displacement rails (60) and (61) on both sides of the table and the belts (63) and (65). The belt (63) is driven by the motor (5) and tension (67) and pulleys (69), and the belt (65) on pulleys (71) and (73), so that the synchronized movement of the belts (63) and (65) is achieved by the action of the synchronization belt (75). The motor (5), driving the pulley (67), moves the carriage (22) across the joints (64) and (74). The pulley (71) allows the carriage to be adjusted to the appropriate position, as it allows an angle adjustment against the axis, producing a lengthwise movement of (74) against (64); once the position is achieved so the carriage (23) is perpendicular to its movement being pulled by (63) and (65), the pulley (71) is blocked against its axis.

Figures 11A, 11B:
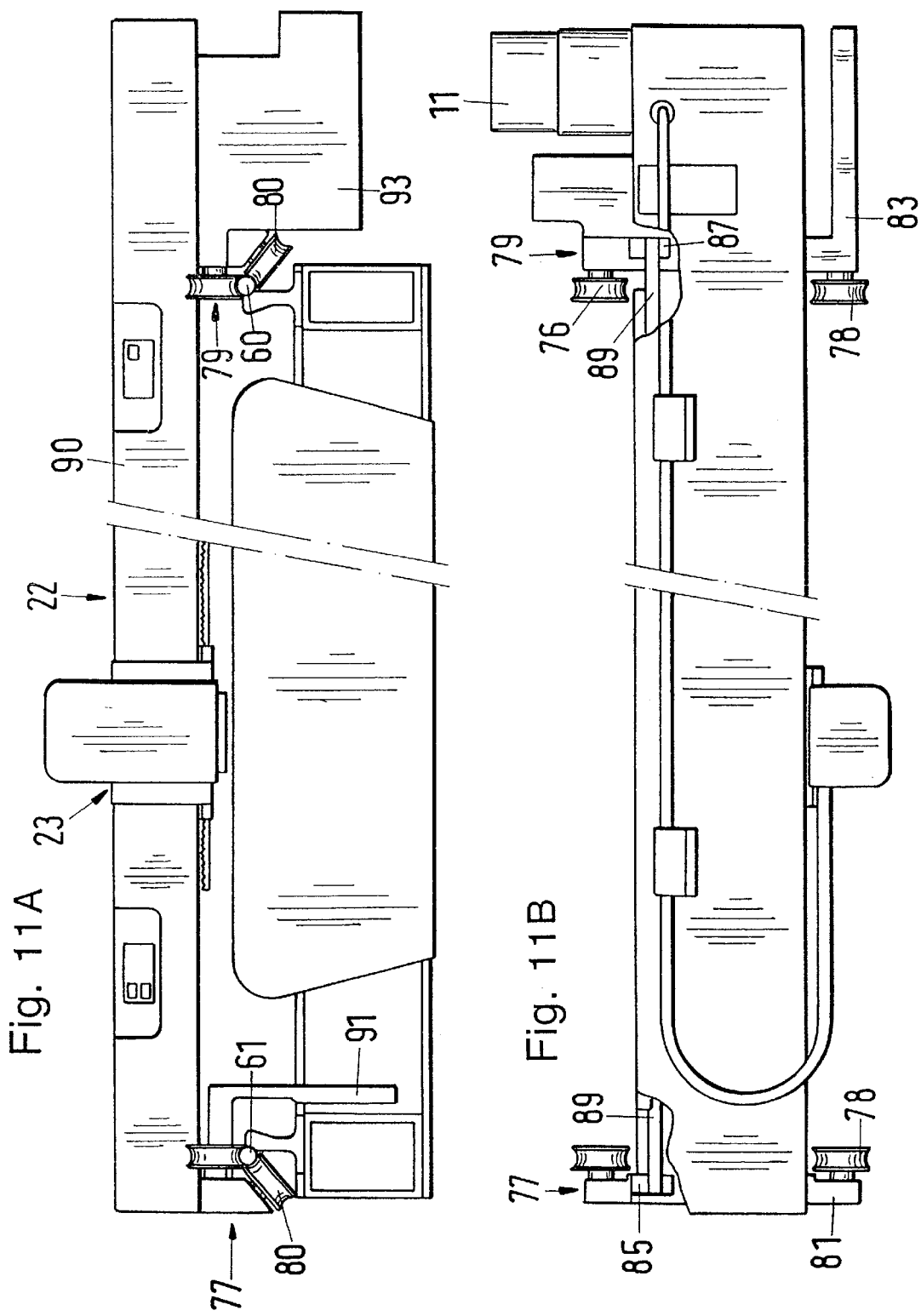
FIGS. 11 (*a* and *b*) are front and upper partial views of the transversal carriage.

FIGS. 7, 8, 9, and 10 provide a more detailed view of the aforementioned sets. The carriage (22) may be seen in detail in FIGS. 11 and 12. It is basically comprised of two end sets (77) and (79) which include the rolling elements on the rails (60) and (61); each one of the sets (77) and (79) has three bearing sets (76), (78), (80) and complementaries (76'), (78') and (80'). In turn, each one of the supports (81) and (83) of the sets (77) and (79) have a housing (85) and (87) to assemble the axle (89) on the U shaped support (90). The supports (81) and (83) also have the tabs (91) and (93) on each, at the points (64) and (74) where they join the belts (63) and (65).

FIG. 13 shows a lateral view of the x and y axis carriages; it is possible to see the relative position of the U shaped beam (90) with the guides (89) and (95) for the Y axis carriage (23) movement.

FIG. 14 shows the carriage (23) with the bearing sets (31), (33) and (35) for movement on the guides (89) and (95).

Considering the above, it could be seen how the U shaped beam (90) turns around the axle (89) inserted in the housings (85) and (87); the previous movement is performed under the action of the spring (91) and the electromagnet (95). The axle (89) is parallel to the plane drawn and the turning described above around it produces a swing movement that brings the paper nearer and pushes it away; the wing of the opposite wing as to the anchorage of the axle (89), where the other guide (95) is attached. The axle (89) is in turn one of the guides that, along with (95), form the rolling path for the carriage (23) on axis X. The carriage (23) has bearing sets (31), (33) and (35) for movement on the guides (89) and (95), as shown in FIG. 14.

The carriage (23) is driven by the action of the motor (11) through the belt (97) and pulleys (99) and (101) (FIGS. 5 and 3). The printer head (32) set is assembled on the carriage (23). This set consists of two or more printing heads (113), (114) that respond to the control signals of the controller (12), as shall be described in greater detail thereunder, which generates the graphic information required.

The swing movement described above pulls the printer head (32) to its upper and lower positions. In the lower position, the nearest to the working surface (20), the head (32) moves by sliding over the paper on it, so the plane (115) of the printer head nozzles (113), (114) is placed at a fixed level of separation from the material to be printed. To achieve this, the head (32) has skids (137) as shown in FIG. 16.

Figure 15:
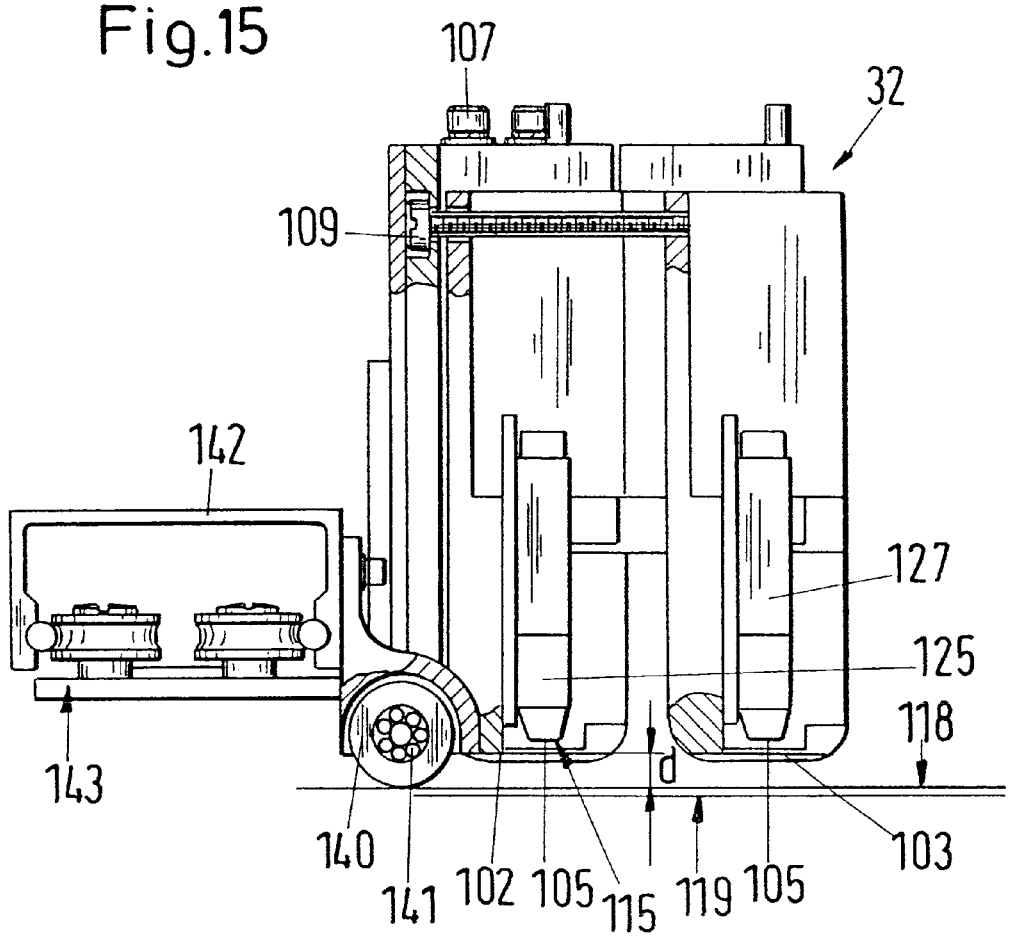
FIG. 15 is a partial side plan view of the head set.
Figure 18:
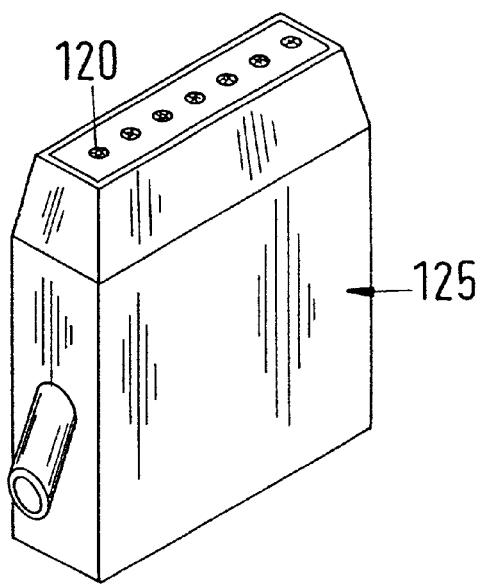
FIG. 18 is a view of a detail of the printer head.
Figure 16:
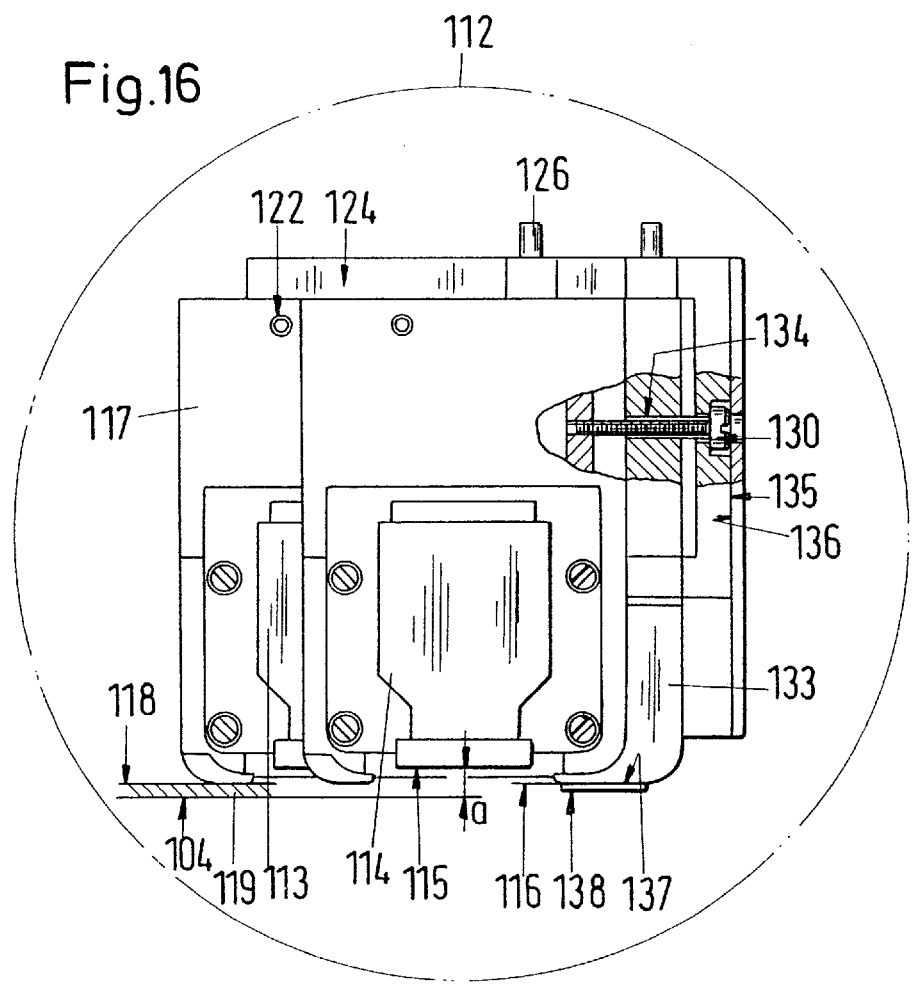
FIG. 16 is a front plan view of the head set.
Figure 17:
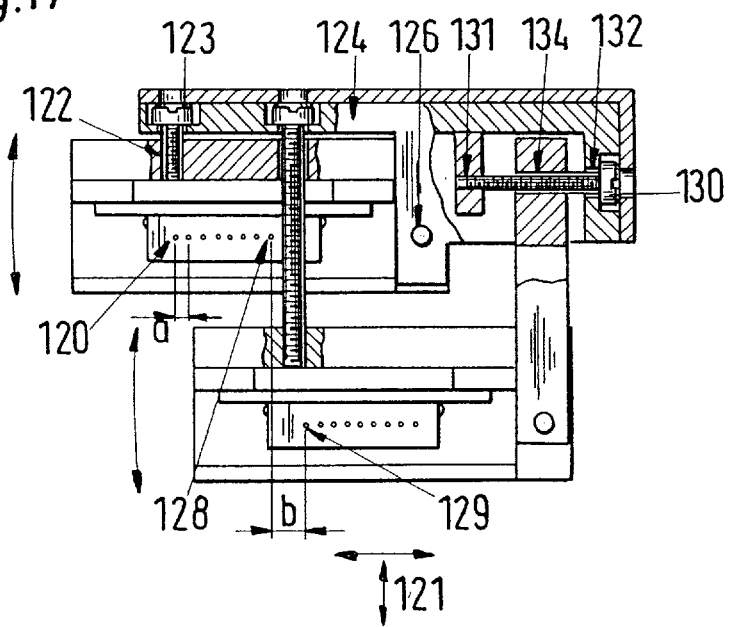
FIG. 17 is a top plan view of the head set.

Each one of the printer heads (113), (114) has an array of nozzles (120) placed in a line as shown in FIGS. 15, 16 and 17. The separation between the nozzles is related to the resolution of the drawing performed by the machine in a specific direction (direction X), while the total length of the linear array provides the width of the head sweep. On the other hand, the carriage (22) travel speed and the trigger frequency of each one of the nozzles provide the resolution of the drawing, according to the other axis perpendicular to the previous one (direction Y). According to the above, one may understand the importance of having such a regulation system for the alignment of the array (120) of nozzles on each one of the heads (113) and (114) as described farther.

The lengthwise nozzle regulating system shown in FIGS. 16 and 17 consists of a sliding support so that its position, according to the direction, may be adapted to the location required, in such a way that the last nozzle (128) of a head (113) is positioned at a distance from the first nozzle (129) of the following head (114), and the distance b is equal to gage c between nozzles. To perform this displacement precisely, there is a screw-threaded axle (130) in the area housed on the sliding support (127) and guided on both ends (131), (132) on the base support (124), so that when this axle (130) turns it moves the sliding support (127) back and forth on the following head support (133), so it places the head nearer or further from the head support (117) before it. The sliding support (127) has a screw-threaded hole (134) to house the screw-threaded axle (130). The screw-threaded axle (130) has its axial displacement on its axis blocked, as it is caught between the fixed surfaces (135), (136) of the base support (124) which prevents this.

The screws (109) and (123) perform the angular adjustment of the printing heads (113), (114); for this purpose they are screwed in areas (122) and (133) to the supports (117) and (127) which can rotate around shafts (125) and (126).

In FIGS. 15, 16 and 17 the part of paper (14) which is deposited in the working area (20) of the machine (10) is named (119); the surface over which the drawing operation is performed has been named (118).

The system also has skids (137), the surface (138) of which has a high slip coefficient, which is in contact with the work surface, when the characteristics require easy replacement when working with very abrasive sheet material (119), or even replacement by another of a more adequate size for the material on which the drawing (printing) is to take place. The machine has a set to purge (111) the ink jet heads. This set allows vacuum and pressure purging (FIG. 19).

Figure 19:
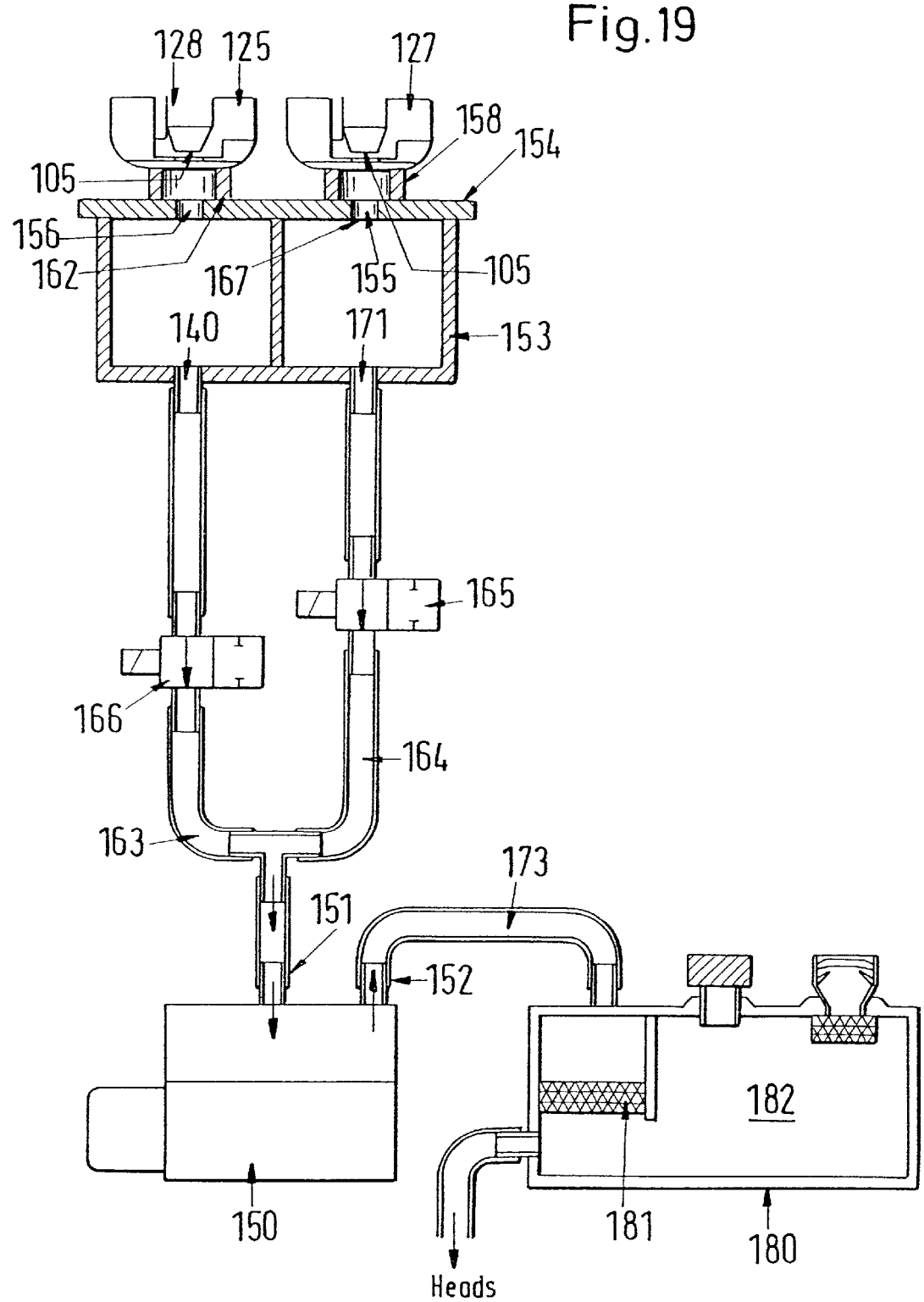
FIG. 19 is a scheme of the purge circuit.

As shown in FIG. 19, the system consists of a pump (150) that generates a vacuum at one of its openings (151) and pressure at the other (152). The vacuum outlet (151) connects the pump (150) to a hermetically sealed tank (153) which has several areas (156) with openings (155) in as many zones as the number of printing heads on it, which are only closed when a head is placed above to close them.

The correct seal is achieved by high deformation joint seals (158), (159) that allow a perfect adaptation to the front surface (115) of the head and the head piece support against the joint. The shape of the joint is described hereunder. The joint is fixed on its lower face (162) to the upper face (154) of the tank, leaving the openings (155) free for flow into the tank (153). These openings (155) are used to extract the ink from the heads (113), (114), being placed over the joint (158), (159) resting on it, deforming it and adapting it to the surface, thus preventing the flow of air; this means that when the pump (150) is activated, the vacuum extracts the ink and possible air bubbles in the nozzles (120). The heads (113), (114) and the supports (117), (127) are sealed with joint seals (107), (110).

The tank (153) inside is divided into as many compartment areas A and B as there are heads, so each head (113), (114) may be purged independently.

The vacuum outlet (151) for the pump (153) branches into several tubes (163), (164), as many as there are heads, (113), (114), with an electro-valve between each (165), (166) for each branch to allow or prevent communication between the extraction opening (151) of the pump (150) and the compartment (140), (171) of the tank (153) assigned to the head (113) or (114) to be purged.

The liquid extracted from the heads (113), (114) using the pump (150) runs out of the presume nozzle (152) which is connected by a tube (173) to the feed tank (180) that has a built-in filter (181) to allow only clean ink into the supply area (180) for the heads, leaving the impurities in the filter. Two advantages are obtained in this way. A clean purging system is available, as the ink is not led off outside, and the ink is taken full advantage of, as it circulates back to the feed tank (180).

FIG. 20 is a block diagram of the plotter control card.

The card is prepared for insertion in a PC-AT bus. The block (201) acts as an interface between the different elements of the card and the PC bus. This block may be changed to adapt to any kind of bus. The block is formed by a series of bi-directional buffers controlled by read-write signals and the address bus.

A programmable address decoder (202) generates selection signals (CS1 . . . CS8) for the different devices on the card. These signals are generated by comparing the base address programmed against the address bus and the signals from the control bus (I/O, R/W et al.).

The controllers (203), (207) and (208) are dedicated to motor movement, including:
  a position feedback signal processor generated by an encoder;
  a trajectory generator-sequencer, to calculate the position required of the motor at all times; and
  PID digital filter to stabilize the servo motor.

An error signal is generated from these three elements to indicate the difference between the position desired and the real one of the servo motor.

The (204) and (210) are amplifiers that use the error signal generated by (203), (207) and (208) to generate the voltage and current required to move the motors 5 (axis X), 11 (axis Y) and 34 (paper movement).

The relevant incremental encoders (206), (212) and (214) are linked to each motor 5, 11 and 34. The encoders (206) and (212) joined together on the axle of their respective motors. The encoder (214) is mounted on a wheel resting on the paper. It thus has an exact control of the movement of the paper at each step of the window, using axis X to correct the difference in movement between that desired and the real movement.

As the movement of the axle and the movement of the paper are never simultaneous, the same amplifier (210) will be used to drive both motors 11 and 34.

A multiplexer (209) communicates the error signal of (207) or (208) to (210) according to the motor to be driven. The relay (215) performs the same function between the output of the amplifier (210) and motors 11 and 34.

The input ( read)/output (write) records (216) and (217) control different elements of the machine:

Multiplexer (209);

Relay (215);

Activation/inhibition of the power phases (204), (210);

Position of the printing heads; and

Axis Y coder (212), etc.

The (113), (114), (114') are the ink jet technology printing heads. Each one includes 128 channels. The trigger control of each channel is performed by a 128 bit record divided into 8 records of one byte width each. To trigger a channel, "1" is written in the relevant bit of the adequate record.

A set of drivers and receivers (221) adapt TTL type signals to be transmitted on a distance.

To write in the different records of each head, 3 address bids must be generated (records 1 to 16) and a write signal, which is dealt with by blocks (222) and (223).

A counter (222) increases one unit each time writing to the heads is performed. This writing matches and input/output address to the PC. After writing 16 times, it selects the next head.

The unit (223) generates the printing signal for the heads and the increase signal (222) from the PC control bus signals. It also adapts the bus times of the PC to the times in the head printing cycle.

After writing the n×16 records (n = number of heads installed on the plotter) the heads begin a trigger cycle, the unit (224) generates the trigger cycle initiation signal from writing the appropriate address of the PC bus. The unit (224) also generates a signal that resets that counter (222) to zero to print from the first record on the first head.

The trigger cycle initiation signal from (224) is synchronized with that of the axle encoder (212), and conveniently divided to obtain the resolution required. This synchronization may be achieved by hardware or software means.

Once the head trigger is performed, a new cycle begins by writing the n×16 records of the heads with the new data.

It will be apparent to those skilled in the art that various modifications and variations can be made in the drawing machine of the present invention without deviating from the spirit or scope of the invention. Thus, it is intended that the present invention cover the modifications and variations of this invention provided they come within the scope of the appended claims and their equivalents.

What is claimed is:

1. A flat raster drawing machine for printing information on a flexible laminate sheet material, comprising:

a support table with a resilient, flat support surface supporting the flexible material;

means for moving the flexible material over the support surface of the table in a direction parallel to a longitudinal axis of the flexible material;

a first trolley positioned between guide means fixed on the table to allow the trolley to move perpendicular to the longitudinal axis of the flexible material;

a second trolley for mounting at least one printing head along the longitudinal axis of the flexible material, said second trolley supporting the printing head so as to maintain a constant with respect to the support surface, and the support surface is much larger than the width of the sweep of the printing head;

means for movement and control of said trolleys;

means to control sequence of movement of said trolleys and said flexible material; and means to control actuation of the printing heads with appropriate plotting resolution in accordance with the information generated by a computer; wherein drawing is provided by successive displacement of said printing heads longitudinally along the table in such a way that at the end of each longitudinal movement, there is a transverse movement of said first trolley in a dimension equivalent to a width of a sweep of said printing heads in the longitudinal direction of the working surface.

2. The flat raster drawing machine according to claim 1, wherein the head bearing trolley having a micrometric adjustment of a position of the heads in relation to each other, so that a distance between a last nozzle on a preceding head and a first nozzle on a next head is maintained equal to a distance between any successive nozzles on the head.

3. The flat raster drawing machine according to claim 2, wherein the second trolley has independent alignment regulations for each head and for the whole, whether at an angle or lengthwise.

4. The flat raster drawing machine according to claim 3, including means to compare a distance moved over the flexible material with a position of the trolley, and means to correct the position of the trolley in case of a difference, so that a part of a drawing in a window and a part of the drawing in a following window maintain an adequate matching.

5. The flat raster drawing machine according to claim 4, wherein writing of different head records is performed sequentially by hardware means without intervention of the control software.

6. The flat raster drawing machine according to claim 5, including a counter to automatically generate an address of a record which is written by said hardware.

7. The flat raster drawing machine according to claim 3, wherein the heads are dot array type printing heads.

8. The flat raster drawing machine according to claim 7, comprising more than one head of the dot array type mounted on the second trolley so that the total width of a sweep is equal to the number of the heads by width of each head sweep.

9. The flat raster drawing machine according to claim 3, wherein the heads are ink jet printer heads.

10. The flat raster drawing machine according to claim 9, including purge system for purging and cleaning the nozzles having vacuum generating units connected to zones on which the heads rest.

11. The flat raster drawing machine according to claim 10, including purge system for purging and cleaning the ink jets having pressure units for the ink nozzle feed circuit.

12. The flat raster drawing machine according to claim 11, wherein the purge system having a number of independent circuits equal to the number of printing heads.

13. The flat raster drawing machine according to claim 12, wherein the ink obtained from purging is recycled and provided to a supply zone.

14. A method of drawing on a flexible material, comprising following steps:

provide a support table with a flat working surface supporting the flexible material;

providing a first trolley moving perpendicular to the longitudinal axis of the flexible material;

providing a second trolley bearing a set of at least two printing heads and moving along the longitudinal axis of the flexible material;

performing successive sweeps of the heads in the longitudinal direction of the table followed by a lateral displacement of the head set at the end of each one of these sweeps; and once the whole width of the flexible material on the table is swept by the heads, moving the flexible material over the surface of the table in a direction parallel to a longitudinal axis of the flexible material.

15. The method of drawing according to claim 14, wherein the size of the displacement of the head set is equal to the width of the sweep, so that a sweep n+1 performed in a direction opposite to a sweep n overlaps perfectly with the preceding one.

16. The method of drawing according to claim 15, wherein the total width of a sweep is equal to a number of the heads by a width of a head sweep.

17. The method of drawing according to claim 16, including steps of compare a distance moved by the trolley over the flexible material with a position of the trolley, and correcting the position of the trolley in case of a difference, so that a part of a drawing in a window and a part of the drawing in a following windows maintain an adequate matching.

18. The method of drawing according to claim 17, including purging and cleaning ink jets of the heads and recycling the ink obtained from purging by providing it to a supply zone.

19. The method of drawing according to claim 18, including triggering the printing heads in accordance with the information generated by a computer.

* * * * *